United States Patent
Hao et al.

(10) Patent No.: US 11,863,268 B2
(45) Date of Patent: Jan. 2, 2024

(54) QUASI-COLOCATION INDICATION FOR NON-ZERO POWER CHANNEL STATE INFORMATION REFERENCE SIGNAL PORT GROUPS

(71) Applicant: QUALCOMM Incorporated, San Diego, CA (US)

(72) Inventors: Chenxi Hao, Beijing (CN); Yu Zhang, Beijing (CN); Alexandros Manolakos, Escondido, CA (US); Chao Wei, Beijing (CN); Hao Xu, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/263,864

(22) PCT Filed: Aug. 10, 2018

(86) PCT No.: PCT/CN2018/100071
§ 371 (c)(1),
(2) Date: Jan. 27, 2021

(87) PCT Pub. No.: WO2020/029288
PCT Pub. Date: Feb. 13, 2020

(65) Prior Publication Data
US 2021/0314043 A1    Oct. 7, 2021

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04B 17/336* (2015.01); *H04L 5/0051* (2013.01)

(58) Field of Classification Search
CPC .. H04B 7/0626; H04B 17/336; H04B 7/0417; H04L 5/0051
See application file for complete search history.

(56) References Cited

U.S. PATENT DOCUMENTS

2014/0369291 A1   12/2014  Zhang et al.
2017/0195031 A1*   7/2017  Onggosanusi ........ H04L 1/0026
(Continued)

FOREIGN PATENT DOCUMENTS

CN       105007600 A      10/2015
CN       107888236 A       4/2018
(Continued)

OTHER PUBLICATIONS

International Search Report and Written Opinion—PCT/CN2018/100071—ISA/EPO—dated May 9, 2019.
(Continued)

*Primary Examiner* — Kwang B Yao
*Assistant Examiner* — Xuan Lu
(74) *Attorney, Agent, or Firm* — QUALCOMM Incorporated

(57) ABSTRACT

A method generally includes determining channel state information reference signal (CSI-RS) port groups associated with one or more non-zero power (NZP) CSI-RS resources for channel measurement (CM) or interference measurement (IM)(902); transmitting an indication of the CSI-RS port groups to at least om UE(904); generating quasi-colocation (QCL) information indicating QCL assumptions for the CSI-RS port groups(906); and transmitting the QCL information to the at least one UE(908).

28 Claims, 15 Drawing Sheets

(51) Int. Cl.
 *H04B 17/336* (2015.01)
 *H04L 5/00* (2006.01)
 *H04B 7/024* (2017.01)

(56) References Cited

U.S. PATENT DOCUMENTS

| | | | |
|---|---|---|---|
| 2018/0054290 A1 | 2/2018 | Park et al. | |
| 2019/0349103 A1* | 11/2019 | Wang | H04B 7/06 |
| 2020/0112355 A1* | 4/2020 | Park | H04B 7/0626 |
| 2020/0119797 A1* | 4/2020 | Wang | H04L 5/0094 |
| 2020/0304258 A1* | 9/2020 | Muruganathan | H04L 5/0057 |
| 2020/0322013 A1* | 10/2020 | Gao | H04B 7/0417 |
| 2021/0091902 A1* | 3/2021 | Yamada | H04W 16/28 |
| 2021/0235452 A1* | 7/2021 | Huang | H04L 5/0094 |
| 2021/0314038 A1* | 10/2021 | Matsumura | H04B 7/0602 |

FOREIGN PATENT DOCUMENTS

| | | |
|---|---|---|
| CN | 108023841 A | 5/2018 |
| CN | 108282212 A | 7/2018 |
| CN | 108282321 A | 7/2018 |
| EP | 3573273 A1 | 11/2019 |
| JP | 2021044598 A * | 3/2021 ........... H04B 7/0452 |
| JP | 2021044598 A | 3/2021 |
| WO | 2018137450 A1 | 8/2018 |

OTHER PUBLICATIONS

Huawei., et al., "Feature Lead Summary #1 of CSI-RS", 3GPP TSG RAN WG1 Ad Hoc Meeting, 3GPP Draft, R1-1801052, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 24, 2018 (Jan. 24, 2018), 9 Pages, XP051385289.
Nokia., et al., "Summary of QCL", 3GPP Draft, R1-1721429, 3GPP TSG RAN WG1 Meeting #91, 3rd Generation Partnership Project (3GPP), Mobile Competence Centre, 650, Route Des Lucioles, F-06921 Sophia-Antipolis Cedex, France, vol. RAN WG1. No. Reno. Nevada, USA, Dec. 27, 2017-Dec. 1, 2017, Nov. 28, 2017 (Nov. 28, 2017), XP051363881, 21 Pages,.
Supplementary European Search Report—EP18929303—Search Authority—The Hague—dated Feb. 18, 2022.

* cited by examiner

```
TCI-State ::= SEQUENCE {
        tci-StateId    TCI-StateId,
        qcl-Type1      QCL-Info,
        qcl-Type2      QCL-Info
}
```

FIG. 7

```
QCL-Info ::=SEQUENCE {
     cell              ServCellIndex
     bwp-Id            BWP-Id
     referenceSignal   CHOICE {
          csi-rs       NZP-CSI-RS-ResourceId,
          ssb          SSB-Index
     },
     qcl-Type          ENUMERATED {typeA, typeB, typeC, typeD},
     ...
}
```

FIG. 8

```
CSI-AssociatedReportConfigInfo ::=SEQUENCE {
    ..
    resourcesForChannel    CHOICE{
        nzp-CSI-RS         SEQUENCE{
        resourceSet        INTEGER (1..maxNrofNZP-CSI-RS-ResourceSetsPerConfig)
        qcl-info           SEQUENCE(SIZE(1..maxNrofAP-CSI-RS-ResourcesPerSet))

qcl-info-PortGroup1    TCI-StateId
            qcl-info-PortGroup2    TCI-StateId
            }
        }
    csi-SSB-ResourceSet    INTEGER(1..maxNrofCSI-SSB-ResourceSetsPerConfig)
    }
    ...
}
```

FIG. 13

```
CSI-AssociatedReportConfigInfo ::= SEQUENCE {
    ...
    nzp-CSI-RS-ResourcesforInterference       INTEGER (1..maxNrofNZP-CSI-RS-
ResourceSetsPerConfig) OPTIONAL,
    qcl-info-nzp-CSI-RS-ResourceforInterference   SEQUENCE(SIZE(1..maxNrofAP-CSI-RS-
ResourcesPerSet)) ) {
        qcl-info-PortGroup1       TCI-StateId
        qcl-info-PortGroup2       TCI-StateId
    }
    ...
}
```

FIG. 14

```
TCI-State ::= SEQUENCE {
    tci-StateId    TCI-StateId,
    qcl-Config1 SEQUENCE{
        qcl-Config1-Type1    QCL-Info,
        qcl-Config1-Type2    QCL-Info
    }
    qcl-Config2 SEQUENCE{
        qcl-Config2-Type1    QCL-Info,
        qcl-Config2-Type2    QCL-Info
    }
}
```

FIG. 15

```
CSI-AssociatedReportConfigInfo ::=SEQUENCE {
...
    resourcesForChannel    CHOICE{
        nzp-CSI-RS         SEQUENCE{
            resourceSet    INTEGER (1..maxNrofNZP-CSI-RS-ResourceSetsPerConfig)
            qcl-info       SEQUENCE(SIZE(1..maxNrofAP-CSI-RS-ResourceSetsPerConfig)) OF TCI-StateId
        }
        csi-SSB-ResourceSet    INTEGER(1..maxNrofCSI-SSB-ResourceSetsPerConfig)
    }
    nzp-CSI-RS-ResourcesforInterference      INTEGER (1..maxNrofNZP-CSI-RS-ResourceSetsPerConfig) OPTIONAL,
    qcl-info-nzp-CSI-RS-ResourcesforInterference    SEQUENCE(SIZE(1..maxNrofAP-CSI-RS-ResourcesPerSet)) OF TCI-StateID
...
}
```

FIG. 16

```
CSI-AssociatedReportConfigInfo ::= SEQUENCE {
    ...
    nzp-CSI-RS-ResourcesforInterference    INTEGER (1..maxNrofNZP-CSI-RS-
ResourceSetsPerConfig) OPTIONAL,
    qcl-info-nzp-CSI-RS-ResourcesforInterference    SEQUENCE(SIZE(1..maxNrofAP-CSI-RS-
ResourcesPerSet)) OF TCI-StateID
    ...
}
```

FIG. 17

QUASI-COLOCATION INDICATION FOR NON-ZERO POWER CHANNEL STATE INFORMATION REFERENCE SIGNAL PORT GROUPS

CROSS-REFERENCE TO RELATED APPLICATIONS

This application is a national stage application under 35 U.S.C. 371 of PCT/CN2018/100071, filed Aug. 10, 2018, which is incorporated herein by reference in its entirety.

INTRODUCTION

Field of the Disclosure

Aspects of the present disclosure relate to wireless communications, and more particularly, to techniques for providing quasi-colocation (QCL) signaling for groups of non-zero power channel state information reference signal (NZP CSI-RS) ports across scenarios involving multiple cells and/or multiple panels (multi-panel).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipment in a wireless network.

Certain aspects provide a method for wireless communication by a base station. The method generally includes determining channel state information reference signal (CSI-RS) port groups associated with one or more non-zero power (NZP) CSI-RS resources for channel measurement (CM) or interference measurement (IM), transmitting an indication of the CSI-RS port groups to at least one UE, generating quasi-colocation (QCL) information indicating QCL assumptions for the CSI-RS port groups, and transmitting the QCL information to the at least one UE.

Certain aspects provide a method for wireless communication by a user equipment. The method generally includes obtaining an indication of channel state information reference signal (CSI-RS) port groups associated with one or more non-zero power (NZP) CSI-RS resources for channel measurement (CM) or interference measurement (IM), obtaining quasi-colocation (QCL) information indicating QCL assumptions for the CSI-RS port groups, performing at least one of channel measurement or interference measurement using the QCL information, and reporting CSI feedback based on the at least one of the channel measurement or the interference measurement.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example transmission configuration indicator (TCI) state, in accordance with certain aspects of the present disclosure.

FIG. 8 illustrates an example of QCL information that may be included in a QCL configuration, in accordance with certain aspects of the present disclosure.

FIG. 13 illustrates an example CSI report configuration, in accordance with certain aspects of the present disclosure.

FIG. 14 illustrates another example CSI report configuration, in accordance with certain aspects of the present disclosure.

FIG. 15 illustrates an example TCI state, in accordance with certain aspects of the present disclosure.

FIG. 16 illustrates an example CSI report configuration, in accordance with certain aspects of the present disclosure.

FIG. 17 illustrates another example CSI report configuration, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
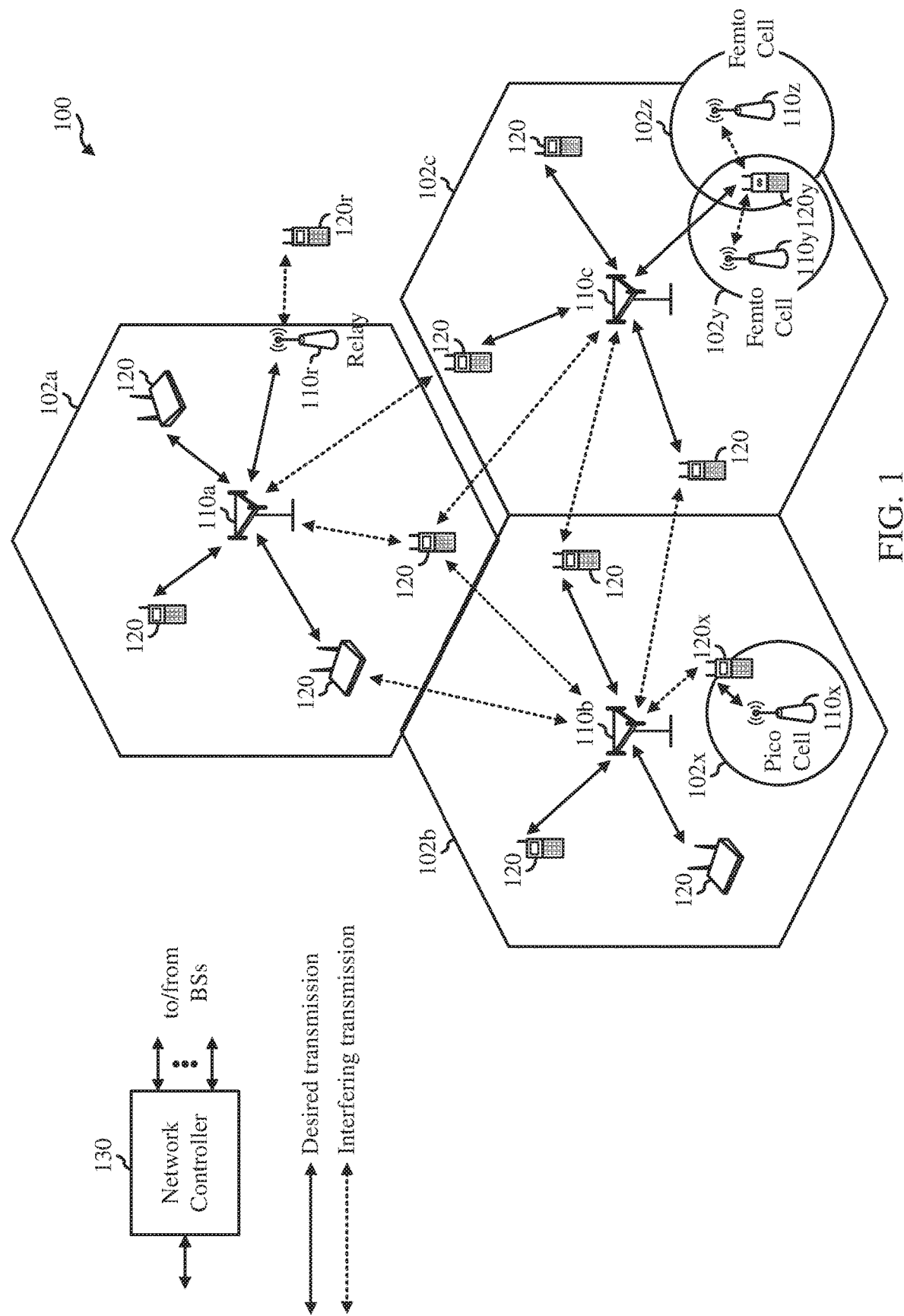
FIG. 1 is a block diagram conceptually illustrating an example telecommunications system, in accordance with certain aspects of the present disclosure.

Aspects of the present disclosure provide apparatus, methods, processing systems, and computer readable mediums for providing quasi-colocation (QCL) signaling for groups of non-zero power channel state information reference signal (NZP CSI-RS) ports across scenarios involving multiple cells and/or multiple panels (multi-panel).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA. OFDMA. SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network provides quasi-colocation (QCL) signaling for groups of non-zero power channel state information reference signal (NZP CSI-RS) ports across scenarios involving multiple cells and/or multiple panels (multi-panel).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG). UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a. 110b and 110c may be macro BSs for the macro cells 102a. 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types. e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
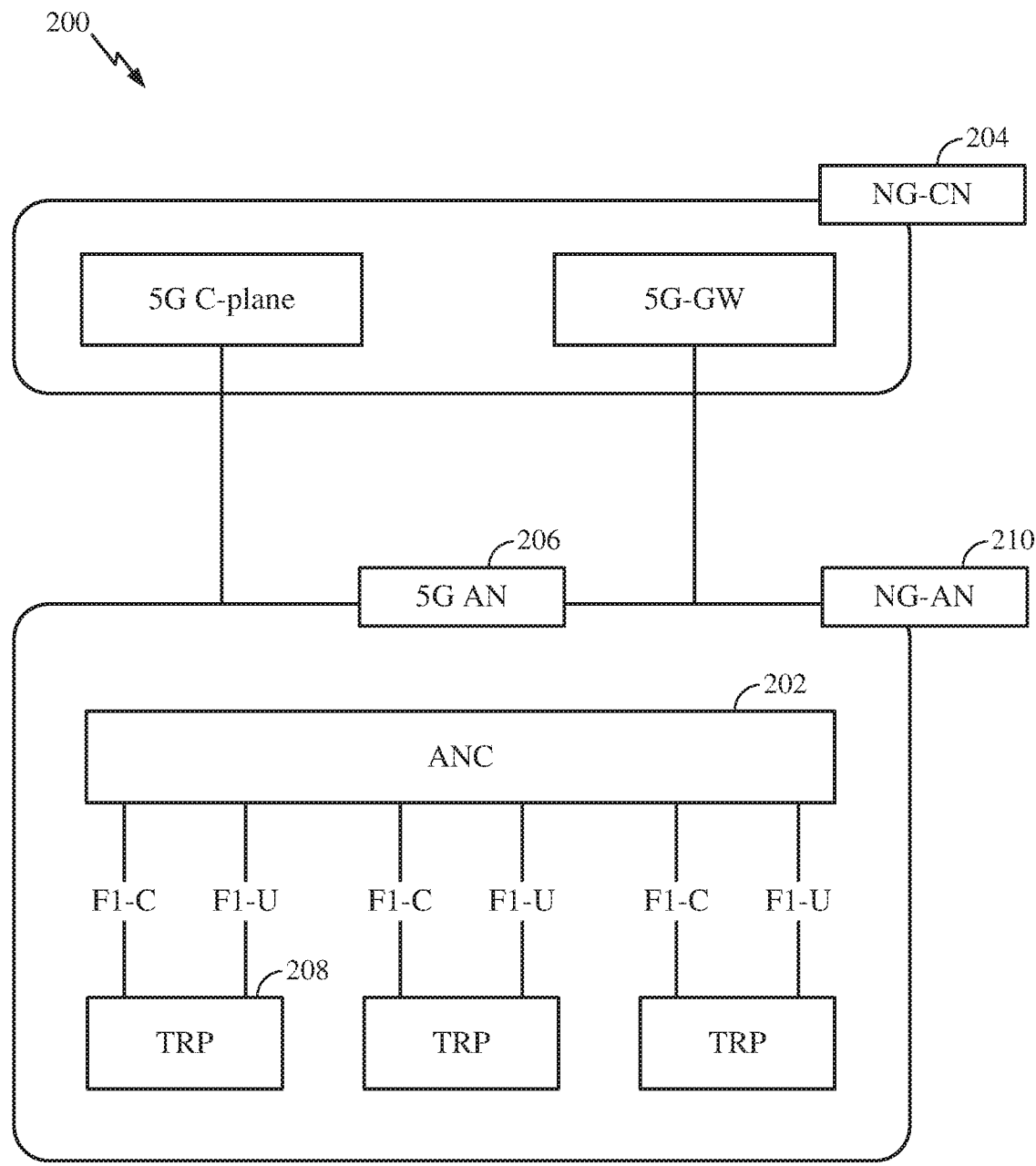
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells. BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer. Radio Link Control (RLC) layer, Medium Access Control (MAC) layer, and a Physical (PHY) layers may be adaptably placed at the DU (e.g., TRP 208) or CU (e.g., ANC 202).

Figure 3:
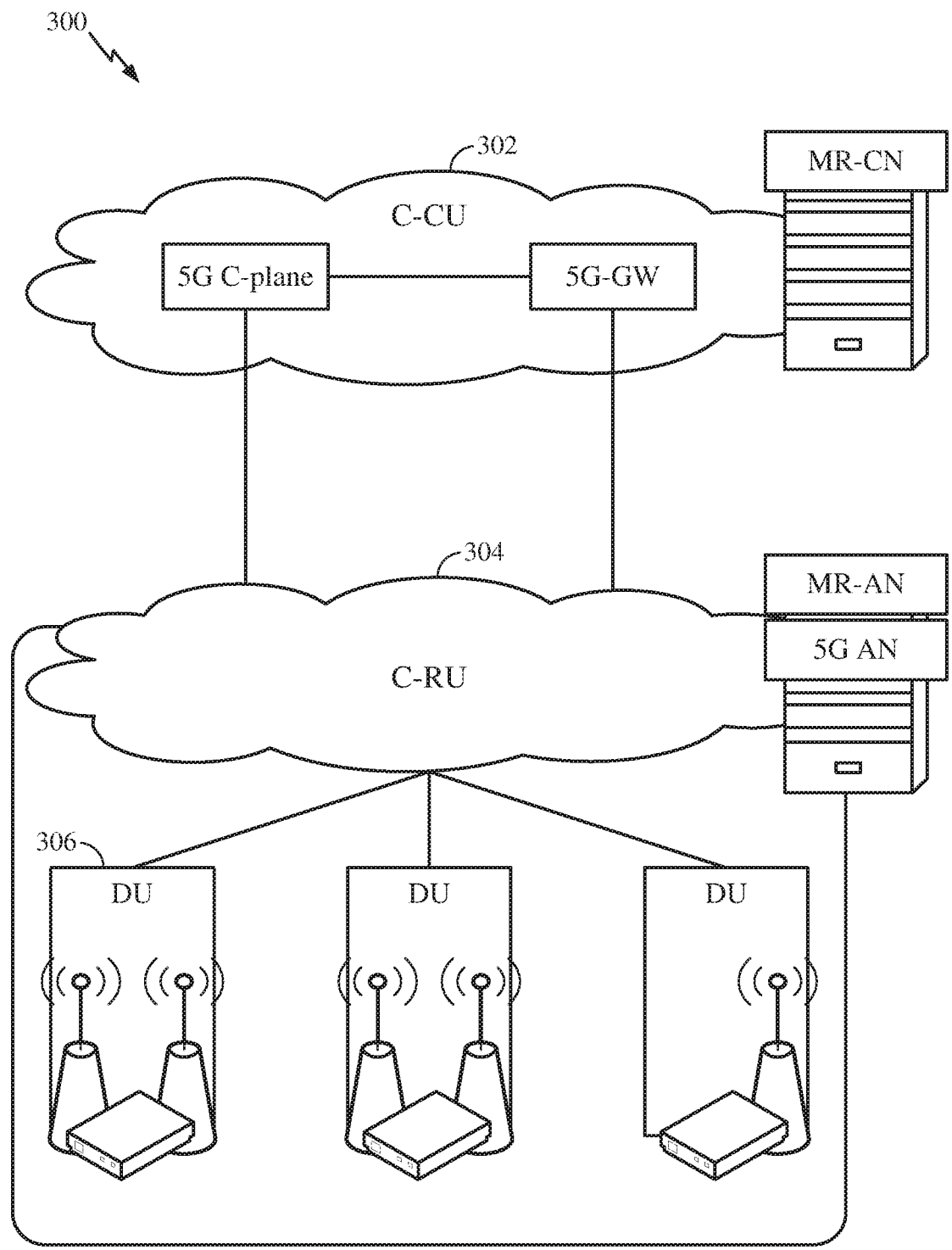
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
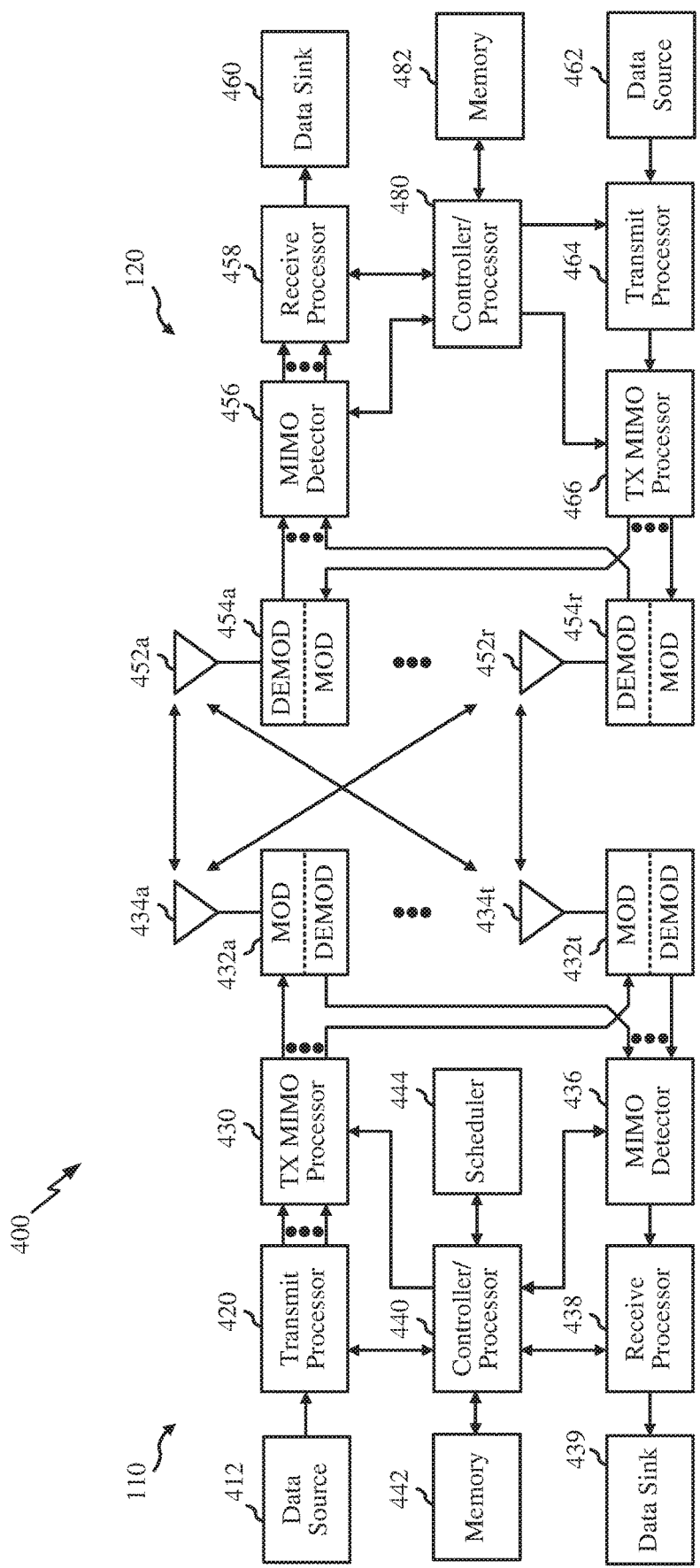
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein (such as the operations illustrated in FIGS. 9 and 10).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
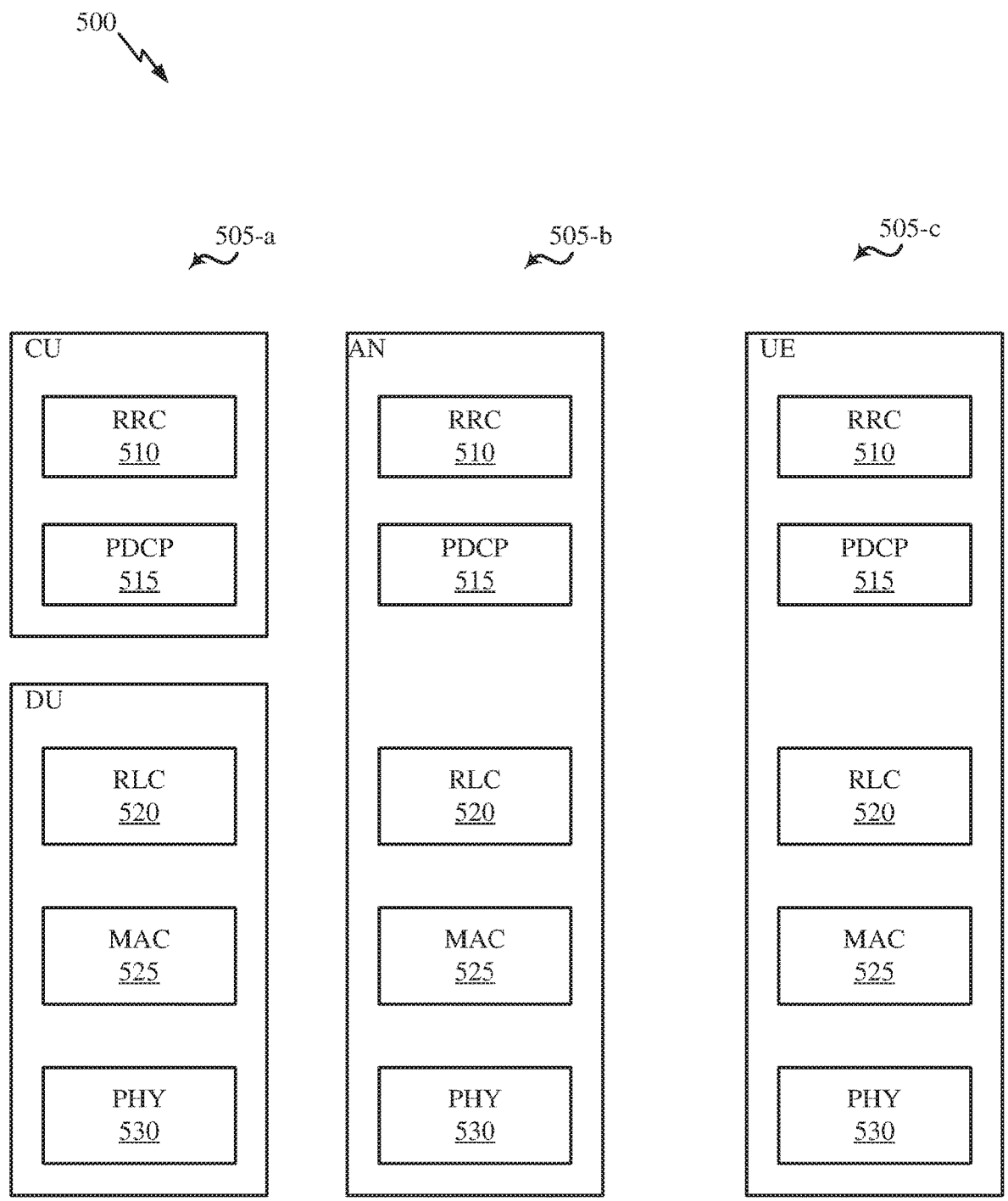
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option. RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PH Y layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
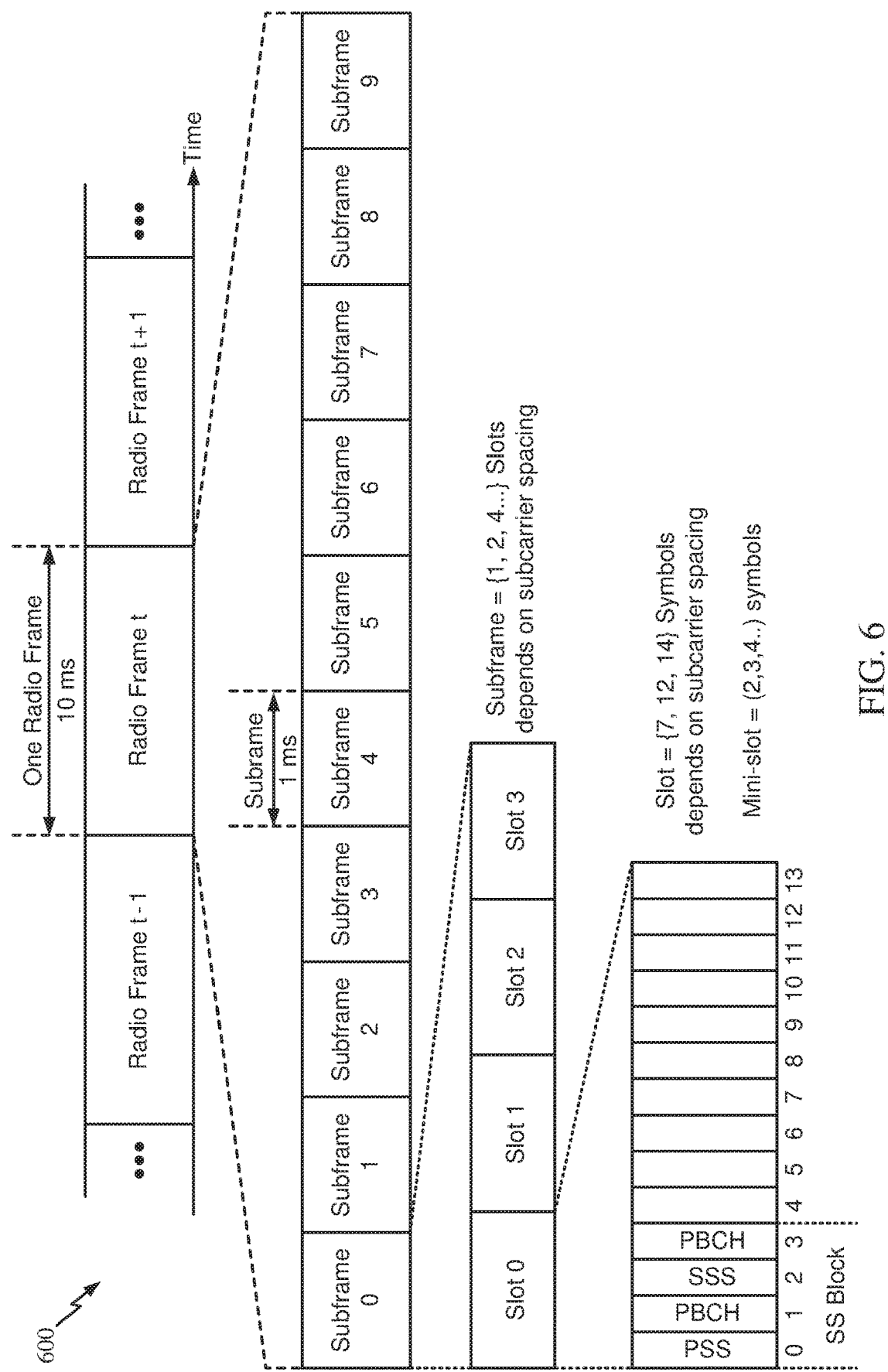
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame. SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs. or to initiate a change of serving cell for one or more of the UEs.

Example Quasi-Colocation Indication for Non-Zero Power Channel State Information Reference Signal Port Group Aspects of the present disclosure provide techniques for providing quasi-colocation (QCL) signaling for groups of non-zero power channel state information reference signal (NZP CSI-RS) ports across scenarios involving multiple cells and/or multiple panels (multi-panel), such as coordinated multipoint (CoMP) scenarios in which a UE is connected to multiple transmit receive points (TRPs).

In wireless communications. CSI may refer to known channel properties of a communication link. The CSI may represent the combined effects of, for example, scattering, fading, and power decay with distance between a transmitter and receiver. Channel and interference measurements may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

QCL assumptions generally refer to assumptions that, for a set of signals or channels considered to be QCL related (or simply "QCL'd" for short), certain characteristics derived for (measured from) one of the signals or channels may be applied to the other. As an example, if a NZP CSI-RS transmission is QCL'd with other DL RS, the doppler shift, doppler spread, average delay spread, average delay, or spatial Rx parameters used for measuring the NZP CSI-RS can be inferred from those used for measuring the other DL RS.

In some cases, QCL assumptions for receptions/transmissions of signals and channels may be signaled via a mechanism referred to as Transmission Configuration Indicator (TCI) states. FIG. 7 illustrates an example TCI state used to configure a DM-RS port group via control signaling, in accordance with certain aspects of the present disclosure. In this example, the TCI state includes a single QCL configuration having at least two types of QCL information. In some cases, a UE may be configured with various TCI states via radio resource control (RRC) signaling, while one of the actual TCI states may be indicated by an N bit DCI field. In some other cases, a UE may be configured with a subset of various TCI states (e.g., up to 8 TCI states) via MAC control signaling (e.g., a MAC control element (MAC-CE)), and downlink control signaling (e.g., DCI) may be used to select a TCI state out of the subset (e.g., 3 bits may be used to identify which TCI state is enabled). For CSI-RS, RRC signaling may configure a list of CSI trigger states, and each trigger state may have one or more CSI report configurations. Each CSI report configuration may link to up to three CSI-RS resources (NZP channel measurement resource (CMR), CSI-IM, and NZP interference measurement resource (IMR)). QCL information may be provided per NZP CMR in the corresponding CSI report configuration of the corresponding trigger state.

FIG. 8 illustrates an example of QCL information that may be included in a QCL configuration, in accordance with certain aspects of the present disclosure. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal. As an example, the QCL assumptions may provide a QCL relationship between a NZP CSI-RS and at least one of another CSI-RS or a synchronization signal (SS). As used herein, a set of QCL'd signals refers to the QCL relationship between those signals (e.g., Doppler shift, Doppler spread, average delay, and/or delay spread).

One limitation of the current QCL configuration is that only one TCI state consisting of a single QCL assumption is provided per CSI-RS resource. That is, all the CSI-RS ports have the same QCL assumptions. Aspects of the present disclosure, however, extend the QCL configuration to allow signaling of QCL assumptions linked to multiple antenna port groups. As such, the QCL signaling provided herein may be applied in CSI-RS port with different beamforming, or multi-TRP/multi-panel scenarios, such as CoMP deployments where multiple transmission reception points (TRPs) communicate with a UE.

Figure 9:
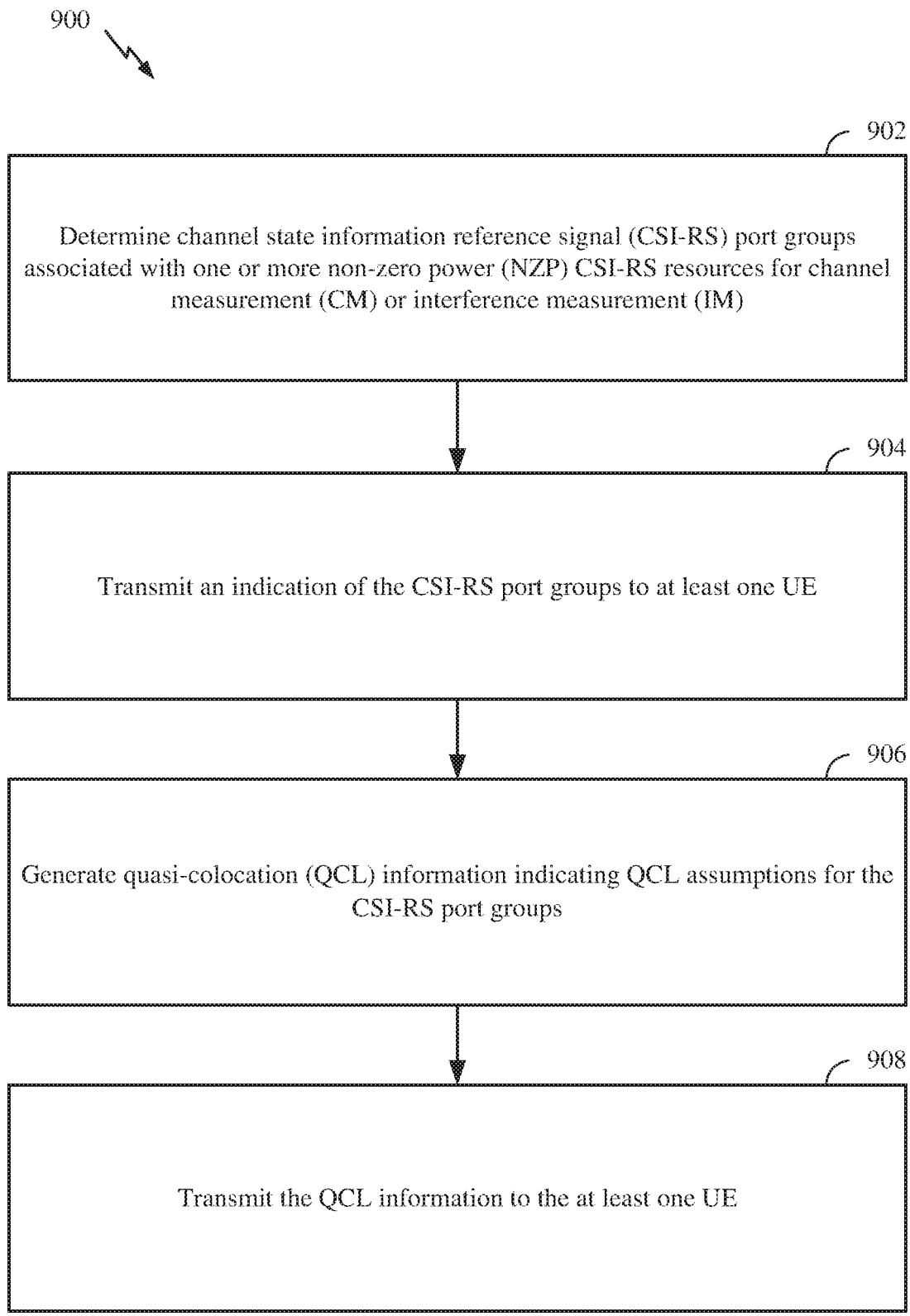
FIG. 9 is a flow diagram illustrating example operations for configuring NZP CSI-RS transmissions with QCL information that supports multi-TRP transmissions, in accordance with certain aspects of the present disclosure.

FIG. 9 is a flow diagram illustrating example operations 900 that may be performed, for example, by a base station (e.g., BS 110), for configuring NZP CSI-RS transmissions with QCL information that supports multi-TRP transmissions, in accordance with certain aspects of the present disclosure.

Operations 900 may begin, at 902, where the BS determines channel state information reference signal (CSI-RS) port groups associated with one or more non-zero power (NZP) CSI-RS resources for channel measurement (CM) or interference measurement (IM). At 904, the BS transmits an indication of the CSI-RS port groups to at least one UE. At 906, the BS generates quasi-colocation (QCL) information indicating QCL assumptions for the CSI-RS port groups. At 908, the BS transmits the QCL information to the at least one UE.

Figure 10:
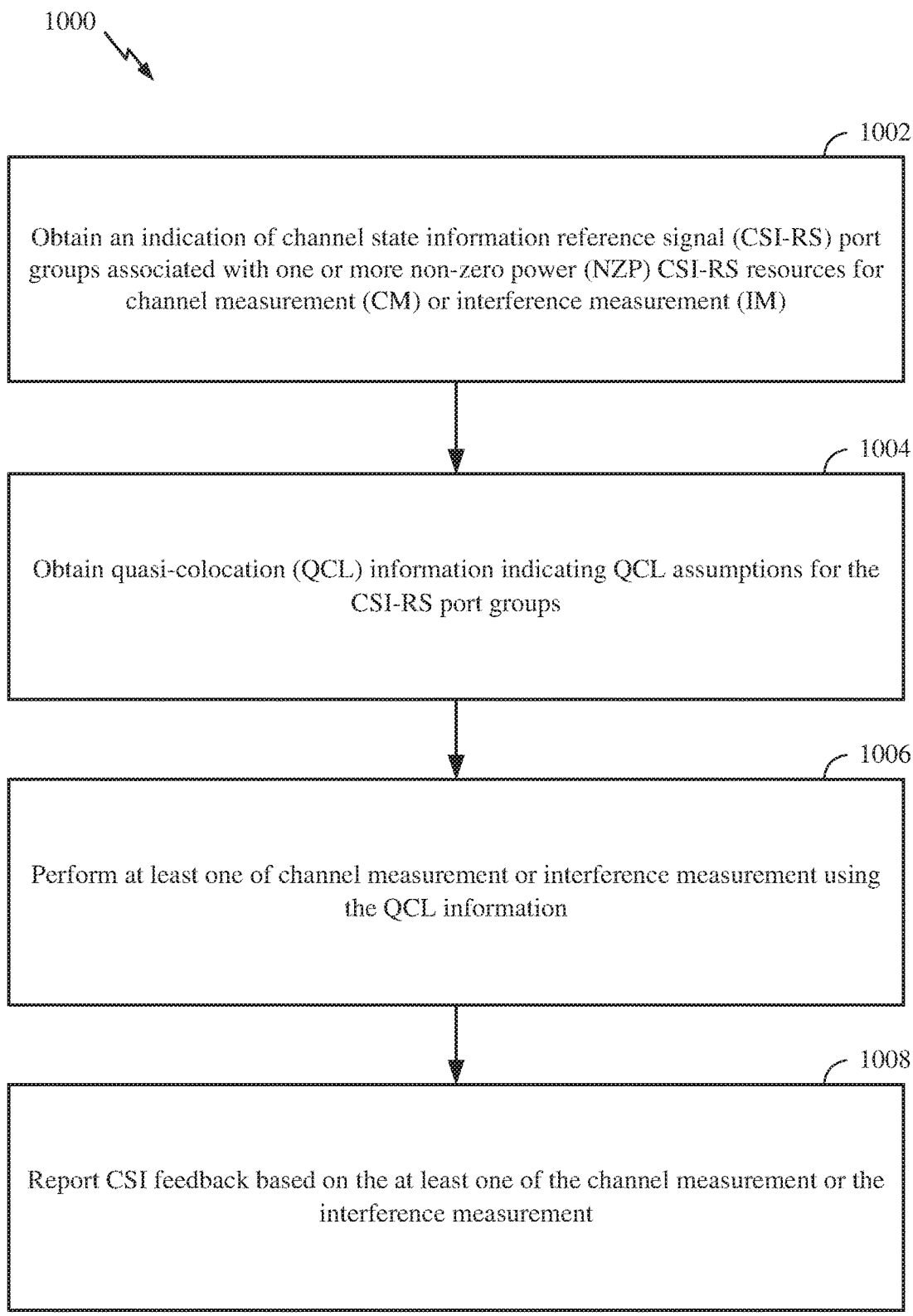
FIG. 10 is a flow diagram illustrating example operations for configuring NZP CSI-RS transmissions with QCL information that supports multi-TRP transmissions, in accordance with certain aspects of the present disclosure.

FIG. 10 is a flow diagram illustrating example operations 1000 that may be performed, for example, by a user equipment (e.g., UE 120), for configuring NZP CSI-RS transmissions with QCL information that supports multi-TRP transmissions, in accordance with certain aspects of the present disclosure.

Operations 1000 may begin, at 1002, where the UE obtains an indication of channel state information reference signal (CSI-RS) port groups associated with one or more non-zero power (NZP) CSI-RS resources for channel measurement (CM) or interference measurement (IM). At 1004, the UE obtains quasi-colocation (QCL) information indicating QCL assumptions for the CSI-RS port groups. At 1006, the UE performs at least one of a channel measurement or an interference measurement using the QCL information. At 1008, the UE reports CSI feedback (e.g., to a base station) based on the at least one of the channel measurement or the interference measurement.

In certain aspects, each NZP CSI-RS resource may be linked to one or more CSI-RS port groups. Also, the number of CSI-RS groups associated with a resource may be different across the different resources. For example, one NZP CSI-RS resource may have two CSI-RS groups, whereas another NZP CSI-RS may have only one CSI-RS group.

The indication of the CSI-RS port groups and/or the QCL information may be transmitted to the UE via control signaling such as radio resource control (RRC) signaling (e.g., RRC element), medium access control (MAC) signaling (e.g., MAC control element (MAC-CE)), or downlink control signaling (e.g., downlink control information (DCI)). The indication of the CSI-RS port groups may be transmitted with a configuration of the NZP CSI-RS resources or in a resource mapping configuration. As an example, the UE may be initially configured with CSI report configurations having the CSI-RS port groups and various TCI states having QCL assumptions linked to the CSI-RS port groups via RRC signaling, and DCI signaling may be used to select the configured TCI states associated with the CSI-RS port groups. The QCL information for CSI-RS port groups may be indicated via RRC signaling. For example, the QCL information may be provided per CSI resource via RRC signaling in the CSI report configuration associated with a CSI trigger state.

In certain aspects, the indication of the CSI-RS port groups provides grouping information for each port of the CSI-RS port groups. The group information may be a bit string or a portion of a bit string associated with each of the CSI-RS port groups. In aspects, the grouping information may be a bit map of CSI-RS ports corresponding to CSI-RS port groups. For instance, a first bit string may indicate the CSI-RS ports that belong to a first CSI-RS port group, and a second bit string may indicate the other CSI-RS ports that belong to a second port group. The total number of bit strings may be equal to the total number of CSI-RS port groups. The total number of bits in each bit string may be equal to the total number of CSI-RS ports associated with the one or more NZP CSI-RS resources. Each bit of a bit string may indicate whether a corresponding CSI-RS port associated with the bit belongs to the respective CSI-RS port group associated with the bit string. As an example, assuming a UE is configured with a NZP CSI-RS resource of 32 ports, a 32-bit bit string may be linked to the first CSI-RS port group, and a second 32-bit bit string may be linked to the second CSI-RS port group. If no grouping information is provided, the UE may assume that all ports belong to the same CSI-RS group.

In aspects, the indication of the CSI-RS port groups may be based on code division multiplexing (CDM) groups. The grouping information may be a bit map of CDM groups having CSI-RS ports corresponding to CSI-RS port groups. For example, a first bit string may indicate the CDM groups that belong to a first port group, and a second bit string may indicate other CDM groups that belong to a second port group. The total number of bit strings may be equal to a total number of CDM groups. The total number of bits in each bit string may be equal to the total number of the CDM groups associated with the NZP CSI-RS resources. Each bit of a bit string may indicate whether a corresponding CDM group associated with the bit belongs to the respective CSI-RS port group associated with the bit string. As an example, assuming a UE is configured with a NZP CSI-RS resource of 32 and CDM-8 is used, then there are four CDM groups available for mapping to a CSI-RS port group. A 4-bit bit string may be linked to the each CSI-RS port group.

Figure 11:
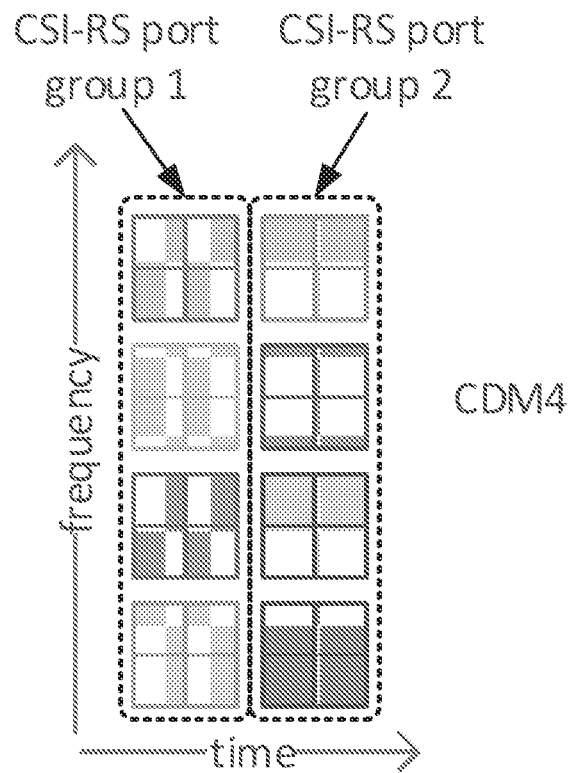
FIG. 11 illustrates a diagram of an example CDM groups partitioned into CSI-RS port groups, in accordance with certain aspects of the present disclosure.

FIG. 11 illustrates a diagram of an example CDM groups partitioned into CSI-RS port groups, in accordance with certain aspects of the present disclosure. As shown, the first CSI-RS port group may be linked to four CDM-4 groups, and the second CSI-RS port group may be linked to four CDM-4 groups.

Figure 12:
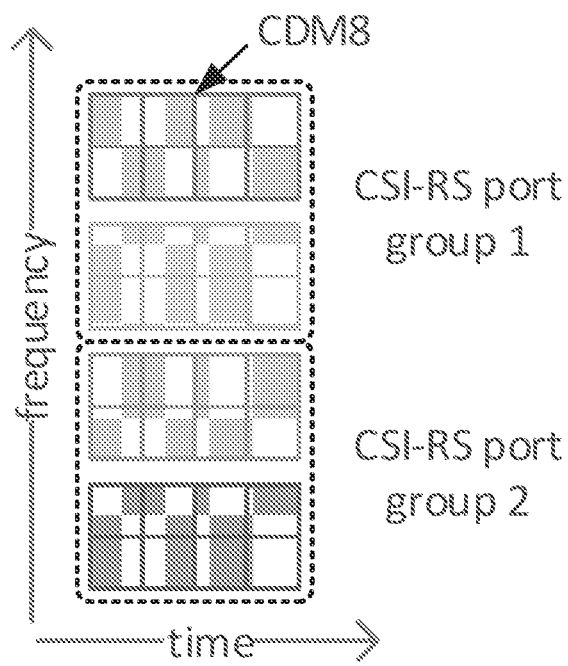
FIG. 12 illustrates a diagram of another example CDM groups partitioned into CSI-RS port groups, in accordance with certain aspects of the present disclosure.

FIG. 12 illustrates a diagram of another example CDM groups partitioned into CSI-RS port groups, in accordance with certain aspects of the present disclosure. As shown, each CSI-RS port group may be linked to two CDM-8 groups.

For aspects, the indication of the CSI-RS port groups may be based on component patterns. The grouping information may be a bit map of component patterns having CSI-RS ports corresponding to CSI-RS port groups. As an example, a first bit string may indicate component patterns that belong to a first CSI-RS port group, and a second bit string may indicate other component patterns that belong to a second CSI-RS port group. The total number of the bit strings may be equal to the total number of the component patterns. The total number of bits in each bit string may be equal to the total number of component patterns associated with the NZP CSI-RS resources. Each bit of a bit string may indicate whether a corresponding component pattern associated with the bit belongs to the respective port group associated with the bit string.

The bit strings identifying the CSI-RS port group mapping may be included in a NZP CSI-RS resource configuration of an RRC message. For example, the NZP-CSI-RS-Resource information element of an RRC message may include a field having a bit string identifying the ports for a first CSI-RS port group (e.g., csi-rs-portGroup1) and a second field having a bit string identifying the ports for a second CSI-RS port group (e.g., csi-rs-portGroup2). As another example, the bit string fields may be included in the CSI-RS-ResourceMapping information element.

The QCL information may be indicated via a plurality of TCI states, where each of the TCI states comprises a QCL configuration (e.g., QCL-info of FIG. 8) associated with one of the CSI-RS port groups. For instance, the TCI state shown in FIG. 7 may be used as one of the plurality of TCI states. The TCI state may be linked to a CSI-RS resource and one of the CSI-RS port groups. As an example, the UE may assume that the first TCI state provides the first QCL assumption for the first CSI-RS port group, and a second TCI state provides the second QCL assumption for the second CSI-RS port group.

FIG. 13 illustrates an example CSI report configuration, in accordance with certain aspects of the present disclosure. The CSI report configuration may be transmitted to the UE, for example via RRC signaling, and provide the indication of the CSI-RS port groups as described herein. In this example, the CSI report configuration may have a field resourcesForChannel providing a CSI-RS resource set for channel measurements. The UE may obtain the NZP CSI-RS resource included in the set by another RRC configuration of the NZP CSI-RS resource set. Then, the UE may obtain the NZP CSI-RS port groups associated with each NZP CSI-RS resource by another RRC configuration of the NZP CSI-RS resource. Next, the field resourcesForChannel may also include a field qcl-info providing QCL information for each CSI-RS port group (e.g., field qcl-info-PortGroup1 is linked to a TCI state with the provided TCI-StateId, and field qcl-info-PortGroup2 is linked to another TCI state with the provided TCI-StateId) of each NZP CSI-RS resource. The CSI report configuration links to one resource set, which has one or more resources. The field qcl-info identifies one or more TCI states, and each of the TCI states is linked to a CSI-RS port group of a resource.

The QCL information is provided in the TCI states (e.g., TCI state of FIG. 7) identified by a TCI state ID in the CSI report configuration as shown in FIG. 13. The payload size of the field qcl-info is linked to the number of CSI-RS resources per set. That is, the length of the sequence qcl-info is equal to the number of resources per set in the CSI report configuration. For example, the CSI-RS resource included in the CSI report configuration may have two resources, resulting in a sequence of QCL information with two elements of qcl-info that identify the TCI states associated with two CSI-RS resources. The first qcl-info identifies two TCI states associated with the first CS-RS resource, where the first TCI state is for the first CSI-RS port group of the first resource, the second TCI state is for the second CSI-RS group of the first resource. The second qcl-info identifies two TCI states associated with the second CSI-RS resource, where the first TCI state is for the first CSI-RS port group of the second resource, and the second TCI state is for the second CSI-RS port group of the second resource.

FIG. 14 illustrates another example CSI report configuration, in accordance with certain aspects of the present disclosure. In this example, the CSI report configuration may identify the QCL assumptions associated with each CSI-RS port group and provide the CSI-RS port groups used for NZP CSI-RS interference measurements. In this example, the CSI report configuration may have a field nzp-CSI-RS-ResourcesForInterference providing one or more CSI-RS resources for interference measurements. The UE may obtain the NZP CSI-RS port groups associated with each NZP CSI-RS resource by another RRC configuration of the NZP CSI-RS resource. Next, the field qcl-info-nzp-CSI-RS-ResourceforInterference provides a sequence that identifies QCL configuration for the CSI-RS port groups of each NZP CSI-RS resources used for interference measurement. The CSI report configuration links to one resource set, which has one or more resources. The field nzp-CSI-RS-ResourcesForInterference is similar to the field qcl-info of FIG. 13 and identifies one or more TCI states, and each of the TCI states is linked to a CSI-RS port group of a resource.

The QCL information is provided in the TCI states (e.g., TCI state of FIG. 7) identified by a TCI state ID in the CSI report configuration as shown in FIG. 14. The payload size of the field nzp-CSI-RS-ResourcesForInterference is linked to the number of NZP CSI-RS resources for interference measurement associated with the corresponding CSI report configuration. That is, the length of the sequence nzp-CSI-RS-ResourcesForInterference is equal to the number of NZP CSI-RS resources for interference measurement associated with the corresponding CSI report configuration. For example, the CSI report configuration may have two NZP CSI-RS resource used for interference measurement, resulting in a sequence of QCL information with two elements of qcl-info-nzp-CSI-RS-ResourceforInterference that identify the TCI states associated with two CSI-RS resources. The first qcl-info-nzp-CSI-RS-ResourceforInterference identifies two TCI states associated with the first CS-RS resource, where the first TCI state is for the first CSI-RS port group of the first resource for interference measurement, the second TCI state is for the second CSI-RS group of the first resource for interference measurement. The second qcl-info-nzp-CSI-RS-ResourceforInterference identifies two TCI states associated with the second CSI-RS resource for interference measurement, where the first TCI state is for the first CSI-RS port group of the second resource for interference measurement, and the second TCI state is for the second CSI-RS port group of the second resource for interference measurement.

In certain aspects, the QCL information may be indicated via a TCI state having at least a first QCL configuration associated with a first CSI-RS port group and a second QCL configuration associated with a second CSI-RS port group. FIG. 15 illustrates an example TCI state used to configure the CSI-RS port groups with QCL information, in accordance with certain aspects of the present disclosure. As illustrated in FIG. 15, the TCI state may provide the QCL assumptions for at least two CSI-RS port groups.

FIG. 16 illustrates an example CSI report configuration, in accordance with certain aspects of the present disclosure. The CSI report configuration may be transmitted to the UE and provide the indication of the CSI-RS port groups as described herein. In this example, the field qcl-info-nzp-CSI-RS-ResourcesforInterference may identify the QCL information associated with each CSI-RS port group of the resources. The payload size of the field qcl-info-nzp-CSI-RS-ResourcesforInterference may be linked to the number of CSI-RS resources used for interference measurement as described herein with respect to FIG. 13. The CSI report configuration may identify the TCI state associated with the CSI-RS port groups via the field TCI-StateID, which may correspond to a TCI state (e.g., TCI-State of FIG. 15) provided to the UE having QCL assumptions for the CSI-RS port groups.

For interference measurement, the QCL information is provided in the TCI state (e.g., TCI-state of FIG. 15) identified by a TCI state ID in the CSI report configuration as shown in FIG. 16. For example, the CSI report configuration may have two NZP CSI-RS resource used for interference measurement, resulting in a sequence of QCL information with two elements of qcl-info-nzp-CSI-RS-ResourceforInterference that identify the TCI states associated with two CSI-RS resources. The first qcl-info-nzp-CSI-RS-ResourceforInterference identifies a first TCI state associated with the first CS-RS resource, where the first TCI state may have two QCL configurations, as shown in FIG. 15. The first QCL configuration may be applied to the first CSI-RS port group of the first resource used for interference measurement, the second QCL configuration may be applied to the second CSI-RS group of the first resource. The second qcl-info-nzp-CSI-RS-ResourceforInterference identifies a second TCI state associated with the second CSI-RS resource used for interference measurement, where the second TCI state may have two QCL configurations, as shown in FIG. 15. The first QCL configuration may be applied to the first CSI-RS port group of the second resource, and the second QCL configuration may be applied to the second CSI-RS port group of the second resource used for interference measurement.

In certain aspects, the CSI report configuration of FIG. 16 may identify the TCI state (e.g., TCI-state of FIG. 15) linked to a resource used for channel measurement and the corresponding CSI-RS port groups. For channel measurement, the CSI report configuration of FIG. 16 may have a field qcl-info similar to the field shown in FIG. 13, but in this case the qcl-info may be linked to a single TCI state per CSI-RS resource. The CSI report configuration may identify one TCI state per CSI-RS resource for channel measurements. As an example, the first QCL configuration in a TCI state may be for the first CSI-RS port group of the resource, and the second QCL configuration in the TCI state may be for the second CSI-RS port group of the resource.

The QCL information is provided in the TCI state (e.g., TCI state of FIG. 15) identified by a TCI state ID in the CSI report configuration as shown in FIG. 16. The payload size of the field qcl-info is linked to the number of NZP CSI-RS resources per set associated with the corresponding CSI report configuration. That is, the length of the sequence qcl-info is equal to the number of resources per set in the CSI report configuration. For example, the CSI-RS resource included in the CSI report configuration may have two resources, resulting in a sequence of QCL information with two elements of qcl-info that identify the TCI states associated with two CSI-RS resources. The first qcl-info identifies a first TCI state associated with the first CS-RS resource used for channel measurement, where the first TCI state may have two QCL configurations, as shown in FIG. 15. The first QCL configuration may be applied to the first CSI-RS port group of the first resource, and the second QCL configuration may be applied to the second CSI-RS group of the first resource. The second qcl-info identifies a second TCI state associated with the second CSI-RS resource used for channel measurement, where the second TCI state may have two QCL configurations, as shown in FIG. 15. The first QCL configuration may be applied to the first CSI-RS port group of the second resource, and the second QCL configuration may be applied to the second CSI-RS port group of the second resource.

As examples, the UE may assume that the first QCL configuration (e.g., qcl-Config1 of FIG. 15) provides the QCL assumptions for the first group of CSI-RS ports, and that the second QCL configuration (e.g., qcl-Config2 of FIG. 15) provides the QCL assumptions for the second group of CSI-RS ports. In situations where one of the QCL configurations provides no QCL information (i.e., the field is reserved), the first QCL configuration may be applied to the QCL assumptions for the first and second group of CSI-RS ports, or vice versa. In other aspects, the first QCL configuration may be applied to the QCL assumptions for the first group of CSI-RS ports, and a default QCL configuration may be applied to the QCL assumptions for the second group of CSI-RS ports, or vice versa. If the UE is configured with only one CSI-RS port group, all the ports may be QCL'd with the same QCL information in the TCI state. Where the UE receives two QCL configurations and is configured with only one CSI-RS port group, the UE may use either of the first or second QCL configurations or apply the QCL configuration based on a group index.

In certain aspects, the BS may identify that all CSI-RS ports associated with one of the one or more NZP CSI-RS resources belong to one CSI-RS port group. The BS may transmit a default CSI-RS port group configuration to the UE for indicating that the CSI-RS ports are associated with a single CSI-RS group. The QCL information may indicate QCL assumptions for the single CSI-RS port group.

The UE may not expect to be configured with different 'QCL-TypeD' assumptions for CSI-RS port groups in one resource. That is, the UE may apply the same spatial QCL assumptions (e.g., QCL-TypeD) for CSI port groups linked to the same resource. In certain aspects, the BS may generate the QCL information with a single spatial QCL assumption or the same spatial QCL assumptions for the CSI-RS port groups associated with one of the NZP CSI-RS resources. That is, the BS may not provide QCL information with different spatial QCL assumptions for the CSI-RS port groups associated with one of the NZP CSI-RS resources.

If no QCL information is provided for a CSI-RS port group used for interference measurement, the UE may assume each NZP CSI-RS port group for the interference measurement has the same QCL information as the respective NZP CSI RS port group for channel measurement. That is, the UE may assume that the CSI-RS resource(s) for channel measurement and the NZP CSI-RS resource(s) for interference measurement configured for one CSI reporting are resource-wise, 'QCL-TypeA' or 'QCL-TypeB' or 'QCL-TypeC', if applicable.

For example, the UE may identify that the QCL information does not provide QCL assumptions for a NZP CSI-RS port group associated with a NZP CSI-RS resource used for interference measurement. Based on this, the UE may identify an association between the NZP CSI-RS port group used for interference measurement and another NZP CSI-RS port group used for channel measurement. The UE may apply the QCL information configured for the NZP CSI-RS port group for channel measurement to the NZP CSI-RS port group used for interference measurement. If there is more than one group configured per resource, then the association is made on a port group basis. If one group is configured per resource, then the association is made on a resource basis.

FIG. 17 illustrates another example CSI report configuration, in accordance with certain aspects of the present disclosure. The CSI report configuration may identify QCL information in a corresponding TCI state for NZP CSI-RS interference measurements. The QCL information may be linked to one or more CSI-RS port groups.

Figure 18:
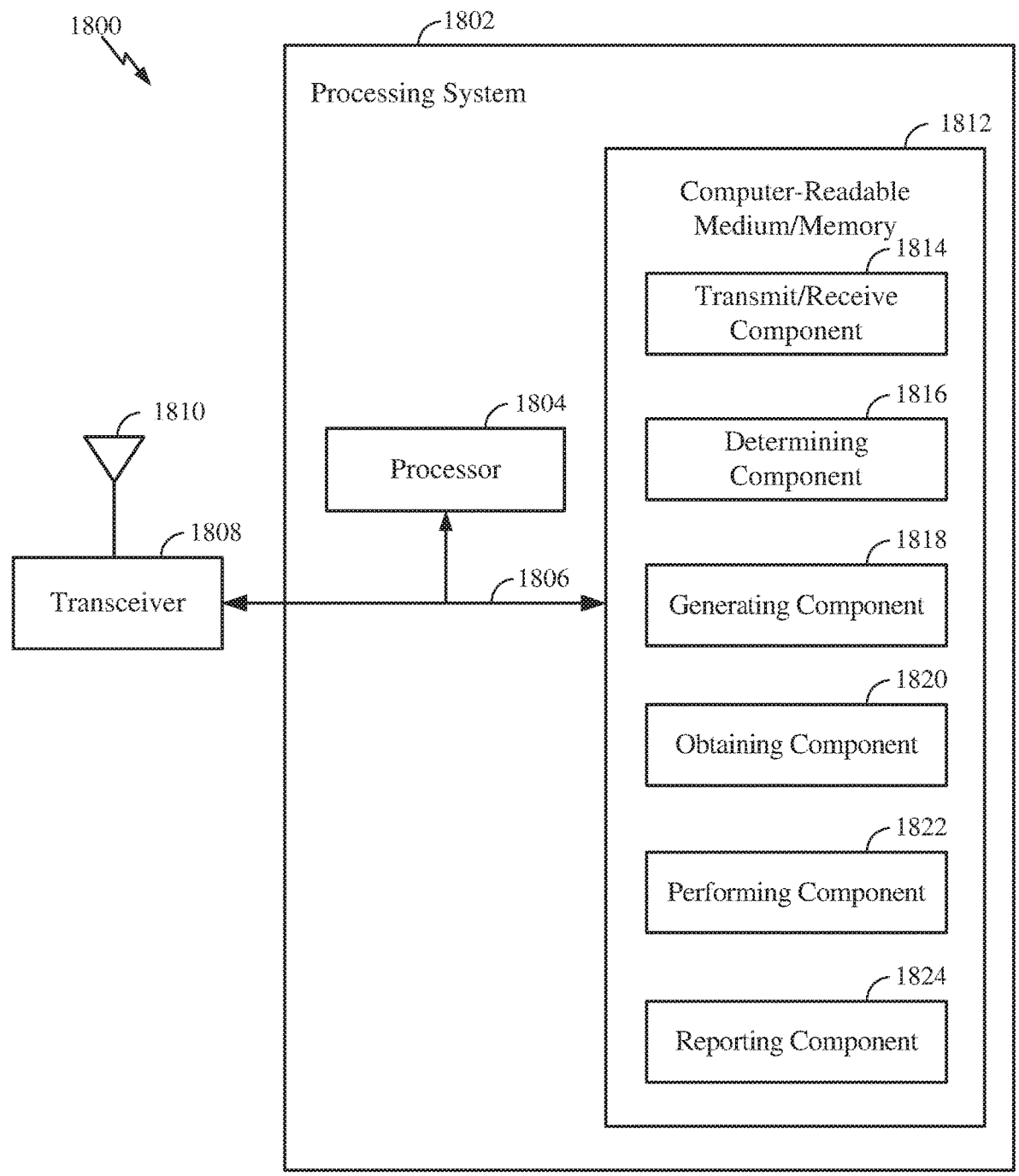
FIG. 18 illustrates a communications device that may include various components configured to perform operations for the techniques disclosed herein in accordance with aspects of the present disclosure.

FIG. 18 illustrates a communications device 1800 (such as a BS 110 or a UE 120) that may include various components (e.g., corresponding to means-plus-function components) configured to perform operations for the techniques disclosed herein, such as the operations illustrated in FIGS. 9 and 10. The communications device 1800 includes a processing system 1802 coupled to a transceiver 1808. The transceiver 1808 is configured to transmit and receive signals for the communications device 1800 via an antenna 1810, such as the various signal described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions that when executed by processor 1804, cause the processor 1804 to perform the operations illustrated in FIGS. 9 and 10, or other operations for performing the various techniques discussed herein.

In certain aspects, the processing system 1802 may include a transmit/receive component 1814 for performing the operations illustrated in FIGS. 9 and 10. Additionally, the processing system 1802 may include a determining component 1816 for performing the operations illustrated in FIGS. 9 and 10. Additionally, the processing system 1802 may include a generating component 1818 for performing the operations illustrated in FIGS. 9 and 10. Additionally, the processing system 1802 may include an obtaining component 1820 for performing the operations illustrated in FIGS. 9 and 10. Additionally, the processing system 1802 may include a performing component 1822 for performing the operations illustrated in FIGS. 9 and 10. Additionally, the processing system 1802 may include a reporting component 1824 for performing the operations illustrated in FIGS. 9 and 10. The transmit/receive component 1814, determining component 1816, generating component 1818, obtaining component 1820, performing component 1822, and reporting component 1824 may be coupled to the processor 1804 via bus 1806. In certain aspects, the transmit/receive component 1814, determining component 1816, generating component 1818, obtaining component 1820, performing component 1822, and reporting component 1824 may be hardware circuits. In certain aspects, the transmit/receive component 1814, determining component 1816, generating component 1818, obtaining component 1820, performing component 1822, and reporting component 1824 may be software components that are executed and run on processor 1804.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include identifying, resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers. DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory). EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair. DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM. ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a base station (BS), comprising:
   determining channel state information reference signal (CSI-RS) port groups associated with one or more non-zero power (NZP) CSI-RS resources for channel measurement (CM) or interference measurement (IM);
   transmitting an indication of the CSI-RS port groups to at least one UE;
   generating quasi-colocation (QCL) information indicating QCL assumptions for the CSI-RS port groups; and
   transmitting the QCL information to the at least one UE comprising transmitting a plurality of transmission configuration indicator (TCI) states for the CSI-RS port groups of the one or more NZP CSI-RS resources, each of the plurality of TCI states comprises a different QCL configuration associated with one of the CSI-RS port groups such that a first TCI state of the plurality of TCI states comprises a first QCL configuration for a first CSI-RS port group and a second TCI state of the plurality of TCI states comprises a second QCL configuration for a second CSI-RS port group, wherein the first QCL configuration is different from the second QCL configuration.

2. The method of claim 1, wherein the indication provides grouping information for each port of the CSI-RS port groups, and wherein each of the one or more NZP CSI-RS resources is linked to at least one of the CSI-RS port groups.

3. The method of claim 2, wherein the indication comprises one or more bit strings comprising a first bit string indicating CSI-RS ports that belong to the first CSI-RS port group and a second bit string indicating other CSI-RS ports that belong to the second CSI-RS port group, and wherein a total number of bit strings is equal to a total number of CSI-RS port groups.

4. The method of claim 1, further comprising:
generating one or more code division multiplexing (CDM) groups having CSI-RS ports, wherein:
determining CSI-RS port groups comprises identifying the one or more CDM groups that correspond to the CSI-RS port groups,
the CSI-RS ports associated with a CDM group belong to the same CSI-RS port group, and
the indication provides grouping information based on the one or more CDM groups.

5. The method of claim 4, wherein the indication comprises one or more bit strings comprising a first bit string indicating the CDM groups that belong to a first port group and a second bit string indicating other CDM groups that belong to a second port group, and wherein a total number of bit strings is equal to a total number of CDM groups.

6. The method of claim 1, further comprising:
generating one or more component patterns having CSI-RS ports, wherein:
determining CSI-RS port groups comprises identifying the one or more component patterns that correspond to the CSI-RS port groups,
the CSI-RS ports associated with a component pattern belong to the same CSI-RS port group, and
the indication provides grouping information based on the one or more component patterns.

7. The method of claim 6, wherein the indication comprises one or more bit strings comprising a first bit string indicating component patterns that belong to the first CSI-RS port group and a second bit string indicating other component patterns that belong to the second CSI-RS port group, and wherein a total number of the bit strings is equal to a total number of the one or more component patterns.

8. The method of claim 1, wherein transmitting the indication comprises transmitting the indication with a configuration of the one or more NZP CSI-RS resources.

9. The method of claim 1, wherein a third TCI state of the plurality of TCI states provides a third QCL assumption for a third CSI-RS port group, and a fourth TCI state of the plurality of TCI states provides a fourth QCL assumption for a fourth CSI-RS port group.

10. The method of claim 1, wherein transmitting the QCL information comprises transmitting a TCI state having at least a third QCL configuration associated with a third CSI-RS port group and a fourth QCL configuration associated with a fourth CSI-RS port group.

11. The method of claim 10, wherein the third QCL configuration provides a third QCL assumption for the third CSI-RS port group, and a fourth QCL configuration provides the fourth QCL assumption for the fourth CSI-RS port group.

12. The method of claim 1, further comprising:
identifying that all CSI-RS ports associated with one of the one or more NZP CSI-RS resources belong to one CSI-RS port group, wherein:
transmitting the indication comprises transmitting a default CSI-RS port group configuration to the UE for indicating that the CSI-RS ports are associated with a single CSI-RS group; and generating the QCL information comprises generating the QCL information indicating QCL assumptions for the CSI-RS port group.

13. A method of wireless communication by a user equipment (UE), comprising:
obtaining an indication of channel state information reference signal (CSI-RS) port groups associated with one or more non-zero power (NZP) CSI-RS resources for channel measurement (CM) or interference measurement (IM);
obtaining quasi-colocation (QCL) information indicating QCL assumptions for the CSI-RS port groups comprising obtaining a plurality of transmission configuration indicator (TCI) states for the one or more NZP CSI-RS resources, each of the plurality of TCI states comprises a different QCL configuration associated with one of the CSI-RS port groups such that a first TCI state of the plurality of TCI states comprises a first QCL configuration for a first CSI-RS port group and a second TCI state of the plurality of TCI states comprises a second QCL configuration for a second CSI-RS port group, wherein the first QCL configuration is different from the second QCL configuration;
performing at least one of a channel measurement or an interference measurement using the QCL information; and
reporting CSI feedback based on the at least one of the channel measurement or the interference measurement.

14. The method of claim 13, wherein the indication provides grouping information for each port of the CSI-RS port groups, and wherein each of the one or more NZP CSI-RS resources is linked to at least one of the CSI-RS port groups.

15. The method of claim 14, wherein the indication comprises one or more bit strings comprising a first bit string indicating CSI-RS ports that belong to the first CSI-RS port group and a second bit string indicating other CSI-RS ports that belong to the second CSI-RS port group, and wherein a total number of bit strings is equal to a total number of CSI-RS port groups.

16. The method of claim 13, wherein the indication provides grouping information based on one or more code division multiplexing (CDM) groups, the method further comprising determining CSI-RS ports associated with the one or more NZP CSI-RS resources based on the one or more CDM groups, wherein the CSI-RS ports associated with a CDM group belong to the same CSI-RS port group.

17. The method of claim 16, wherein the indication comprises one or more bit strings comprising a first bit string indicating the CDM groups that belong to a first port group and a second bit string indicating other CDM groups that belong to a second port group, and wherein a total number of bit strings is equal to a total number of CDM groups.

18. The method of claim 13, wherein the indication provides grouping information based on one or more component patterns, the method further comprising determining CSI-RS ports associated with the one or more NZP CSI-RS resources based on the one or more component patterns, wherein the CSI-RS ports associated with a component pattern belong to the same CSI-RS port group.

19. The method of claim 18, wherein the indication comprises one or more bit strings comprising a first bit string indicating CSI-RS ports that belong to the first CSI-RS port group, and a second bit string indicating other CSI-RS ports that belong to the second CSI-RS port group, and wherein a total number of bit strings is equal to a total number of the one or more component patterns.

20. The method of claim 13, wherein a third TCI state of the plurality of TCI states provides a third QCL assumption for a third CSI-RS port group, and a fourth TCI state of the plurality of TCI states provides a fourth QCL assumption for a fourth CSI-RS port group.

21. The method of claim 13, wherein obtaining the QCL information comprises obtaining a TCI state having at least a third QCL configuration associated with a third CSI-RS port group and a fourth QCL configuration associated with a fourth CSI-RS port group.

22. The method of claim 21, wherein the third QCL configuration provides a third QCL assumption for the third CSI-RS port group, and the fourth QCL configuration provides a fourth QCL assumption for the fourth CSI-RS port group.

23. The method of claim 21, wherein the second QCL configuration provides no QCL assumption, and wherein performing the at least one of channel measurement or interference measurement comprises applying the first QCL configuration or a default QCL configuration as the second QCL assumption.

24. The method of claim 13, wherein:
the indication provides a default CSI-RS port group configuration indicating that the CSI-RS ports of one of the one or more NZP CSI-RS resources are associated with a single CSI-RS group; and
the QCL information provides QCL assumptions for the CSI-RS port group.

25. The method of claim 13, further comprising:
identifying that the QCL information does not provide QCL assumptions for a first NZP CSI-RS port group associated with the one or more NZP CSI-RS resources used for interference measurement; and
identifying an association between the first NZP CSI-RS port group used for interference measurement and a second NZP CSI-RS port group associated with the one or more NZP CSI-RS resources used for channel measurement, wherein performing at least one of channel measurement or interference measurement comprises applying the QCL information configured for the second NZP CSI-RS port group used for channel measurement to the first NZP CSI-RS port group used for interference measurement.

26. The method of claim 13, further comprising:
identifying that the QCL information provides different spatial QCL assumptions for CSI-RS port groups associated with one of the one or more NZP CSI-RS resources, wherein performing at least one of channel measurement or interference measurement comprises applying one of the spatial QCL assumptions to the CSI-RS port groups associated with the one of the one or more NZP CSI-RS resources.

27. An apparatus for wireless communication, comprising:
a memory;
a processor coupled to the memory, the processor and the memory being configured to:
determine channel state information reference signal (CSI-RS) port groups associated with one or more non-zero power (NZP) CSI-RS resources for channel measurement (CM) or interference measurement (IM), and
generate quasi-colocation (QCL) information indicating QCL assumptions for the CSI-RS port groups; and
a transmitter configured to transmit an indication of the CSI-RS port groups and the QCL information to at least one UE comprising transmitting a plurality of transmission configuration indicator (TCI) states for the CSI-RS port groups of the one or more NZP CSI-RS resources, each of the plurality of TCI states comprises a different QCL configuration associated with one of the CSI-RS port groups such that a first TCI state of the plurality of TCI states comprises a first QCL configuration for a first CSI-RS port group and a second TCI state of the plurality of TCI states comprises a second QCL configuration for a second CSI-RS port group, wherein the first QCL configuration is different from the second QCL configuration.

28. An apparatus for wireless communication, comprising:
a receiver configured to:
obtain an indication of channel state information reference signal (CSI-RS) port groups associated with one or more non-zero power (NZP) CSI-RS resources for channel measurement (CM) or interference measurement (IM), and
obtain quasi-colocation (QCL) information indicating QCL assumptions for the CSI-RS port groups comprising obtaining a plurality of transmission configuration indicator (TCI) states for the one or more NZP CSI-RS resources, each of the plurality of TCI states comprises a different QCL configuration associated with one of the CSI-RS port groups such that a first TCI state of the plurality of TCI states comprises a first QCL configuration for a first CSI-RS port group and a second TCI state of the plurality of TCI states comprises a second QCL configuration for a second CSI-RS port group, wherein the first QCL configuration is different from the second QCL configuration;
a memory;
a processor coupled to the memory, the processor and the memory being configured to perform at least one of a channel measurement or an interference measurement using the QCL information; and
a transmitter configured to report CSI feedback based on the at least one of the channel measurement or the interference measurement.

* * * * *